United States Patent [19]

Frances et al.

[11] Patent Number: 5,629,387

[45] Date of Patent: May 13, 1997

[54] SILICONE COMPOSITIONS COMPRISING LONG CHAIN α-ACETYLENIC ALCOHOL HYDROSILYLATION INHIBITORS

[75] Inventors: Jean-Marc Frances, Villeurbanne, France; Robert S. Dordick, Matthews, N.C.; Andre Soldat, Lyon, France

[73] Assignee: Rhone-Poulenc Chimie, Courbevoie Cedex, France

[21] Appl. No.: 526,780

[22] Filed: Sep. 11, 1995

Related U.S. Application Data

[63] Continuation of Ser. No. 235,526, Apr. 29, 1994, abandoned.

[30] Foreign Application Priority Data

Apr. 30, 1993 [FR] France ................... 93 05130

[51] Int. Cl.⁶ .................................................. C08F 283/00
[52] U.S. Cl. ..................... 525/478; 528/15; 524/837
[58] Field of Search .......................... 528/15; 524/837; 525/478

[56] References Cited

U.S. PATENT DOCUMENTS

| | | |
|---|---|---|
| 3,445,420 | 5/1969 | Kookootsedes et al. ............. 528/15 |
| 5,082,894 | 1/1992 | Vanwert ................................ 525/478 |
| 5,270,425 | 12/1993 | Vanwert ................................ 528/15 |

FOREIGN PATENT DOCUMENTS

| | | |
|---|---|---|
| 0451946 | 10/1991 | European Pat. Off. . |
| 0497565 | 8/1992 | European Pat. Off. . |
| 1528464 | 12/1967 | France . |
| 2372874 | 6/1978 | France . |

OTHER PUBLICATIONS

Chemical Abstracts, vol. 113, No. 8, Aug. 20, 1990, Columbus, Ohio; abstract No. 61033m, Hara, Yusuaki "Retardation effect by acetylene derivatives, etc.", & Nippon Kagaku Kaishi, No. 5, 1990, pp. 541–546.

*Primary Examiner*—Melvyn I. Marquis
*Attorney, Agent, or Firm*—Burns, Doane, Swecker & Mathis, L.L.P.

[57] ABSTRACT

Stable curable silicone compositions, well suited for the deposition of release coatings onto a wide variety of substrates, for example paper or plastic films, comprise a hydrosilylation-curable polyorganosiloxane oil and/or at least one Si alkenylated organopolysiloxane resin and, optionally, at least one organohydrosiloxane resin, an SiH crosslinking agent therefor, a hydrosilylation-inhibiting amount of a long chain acetylenic alcohol, advantageously having a boiling point higher than 250° C., and a catalytically effective amount of a hydrosilylation catalyst, e.g., platinum or a platinum compound/complex.

30 Claims, No Drawings

SILICONE COMPOSITIONS COMPRISING LONG CHAIN α-ACETYLENIC ALCOHOL HYDROSILYLATION INHIBITORS

This application is a continuation of application Ser. No. 08/235,526, filed Apr. 29, 1994, now abandoned.

BACKGROUND OF THE INVENTION

1. Field of the Invention

The present invention relates to long (at least $C_{11}$) chain α-acetylenic alcohols as inhibitors of hydrosilylation and to the preparation of stable curable silicone compositions therefrom, preferably of a solvent-free type. These compositions are especially well suited for producing release coatings.

2. Description of the Prior Art

It is known to this art to employ acetylenic compounds such as acetylenic alcohols having a boiling point lower than 250° C., especially 2-methyl-3-butyn-2-ol and ethynylcyclohexanol, as hydrosilylation inhibitors in curable compositions, of solvent-free type, based on an organosilicon polymer bearing olefinically unsaturated substituents (especially of vinyl type), on an organohydrosiloxane polymer and on a catalyst of the platinum or platinum compound type. These compositions can be deposited onto substrates such as paper, for example via coating technique, and can be cured thermally at a temperature on the order of 80° to 250° C., especially from 100° to 220° C., for 3 to 180 seconds (FR-B-1,528,464 and FR-A-2,372,874).

These compositions present the disadvantage, in the case of the preparation of release coatings, of not being capable of crosslinking on the substrate at a temperature of less than 80° C. and of exhibiting an insufficient stability during coating on a machine, gelling of the coating bath already being observed after one hour.

This is due to the fact that these inhibitors can sublime. This major disadvantage requires that they be employed in large amounts, and this results in a marked inhibition of the activity of platinum and, consequently, also mandates the use of a large amount of said catalyst.

SUMMARY OF THE INVENTION

It has now unexpectedly been determined that long (at least $C_{11}$) chain α-acetylenic alcohols, alcohols whose boiling points are generally higher than 250° C., are effective hydrosilylation inhibitors when formulated into curable silicone compositions, which compositions (a) are stable for a number of hours during coating operations on a machine; (b) crosslink rapidly on a substrate at a curing temperature of less than 80° C., preferably even less than 75° C.; (c) exhibit a high bath stability at 40° C.; and (d) may optionally contain lesser amounts of hydrosilylation catalyst, given that a large quantity of inhibitor is no longer required.

Accordingly, the present invention features acetylenic alcohol hydrosilylation inhibitors having the formula

$$R-(R')C(OH)-C\equiv CH \qquad (I)$$

in which R is a linear or branched alkyl radical or a phenyl radical, R' is H or a linear or branched alkyl radical or a phenyl radical, with the proviso that the radicals R and R' with the carbon atom situated in the α-position to the triple bond, may together form a ring member, and further wherein the total number of carbon atoms contained in R and R' is at least 9, preferably at least 11 and more preferably from 11 to 20.

DETAILED DESCRIPTION OF BEST MODE AND PREFERRED EMBODIMENTS OF THE INVENTION

More particularly according to the present invention, the subject acetylenic alcohols preferably have boiling points above 250° C. Exemplary of such alcohols are:

(i) 3-methyl-1-dodecyn-3-ol, (ii) 3,7,11-trimethyl-1-dodecyn-3-ol, (iii) 1,1-diphenyl-2-propyn-3-ol, (iv) 3-ethyl-6-ethyl-1-nonyn-3-ol, (v) 3-methyl-1-pentadecyn-3-ol.

These α-acetylenic alcohols are commercially available.

The inhibitors of the invention can be used for the preparation of silicone compositions that cure via a hydrosilylation reaction in the presence of a hydrosilylation catalyst, especially of the platinum or platinum compound type.

Silicone compositions that cure by a hydrosilylation in the presence of a hydrosilylation catalyst, especially of the platinum or platinum compound type, and containing the inhibitors of the invention, are very particularly advantageous for providing release coatings on flexible substrates such as paper of various types, cardboard, cellulose sheets, metal sheets, plastic films, etc.

Thus, the present invention also features curable silicone compositions comprising:

(1) $z=(100-x-y)$ parts by weight of at least one ($BO^{Si}_{alkenyl}$) base "Si alkenyl" polydiorganosiloxane oil which comprises a linear or cyclic polydiorganosiloxane blocked with triorganosiloxane endgroups, the organic radicals being $C_1-C_{18}$ alkyl or cycloalkyl, $C_2-C_{20}$, preferably $C_2-C_{12}$ alkenyl, ($C_3-C_9$ alkenyl ) oxyalkylene ($C_2-C_4$) or phenyl radicals, at least 80 mol % of said radicals being methyl radicals, and at least 0.1 mol %, preferably from 0.5% to 5 mol % of said organic radicals, which may be identical or different, being alkenyl or alkenyloxyalkylene radicals bonded directly to silicon ("Si alkenyl");

(2) x parts by weight of at least one organopolysiloxane adhesion modifier resin containing "Si alkenyl" functional groups ($MR^{Si\ alkenyl}$), which comprises at least two types of different siloxy units "M" ($R_3SiO_{1/2}$), "Q" ($SiO_2$) and/or "T" ($RSiO_{3/2}$) and optionally "D" ($R_2SiO_{2/2}$), the organic radicals, which may be identical or different, being $C_1-C_{18}$ alkyl or cycloalkyl, $C_2-C_{20}$, preferably $C_2-C_2$, alkenyl or ($C_3-C_9$ alkenyl) oxyalkylene($C_2-C_4$) radicals, at least 80 mol % of the organic radicals being methyl radicals, and said resin containing at least 0.1 mol %, preferably from 0.5% to 5 mol %, of said identical or different alkenyl or alkenyloxyalkylene radicals bonded to silicon ("Si alkenyl"), with a ratio of the number of "M" units/ number of "Q" and/or "T" units of 0.6–1, the number of optional "D" units being 0.5–10 per 100 moles of resin;

(3) -parts by weight of at least one adhesion modifier resin containing an organohydropolysiloxane "SiH" functional group ($MR^{SiH}$) which comprises at least two types of different siloxy units "M" ($R_3SiO_{1/2}$ or $R_2HSiO_{1/2}$), "Q" and/o "T" ($RSiO_{3/2}$ or $HSiO_{3/2}$) and optionally "D" ($R_2SiO_{2/2}$), the organic radicals R, which may be identical or different, being $C_1-C_{18}$ alkyl or phenyl radicals, at least 80 mol % of said radicals being methyl radicals, and said resin containing at least 0.5 mol %, preferably from 0.5% to 5 mol %, of hydrogen atoms bonded directly to silicon ("SiH"), with a ratio of the number of "M" units/number of "Q" and/or "T" units of 0.6–1, the number of optional "D" units being 0.5–10 per 100 moles of resin; with the proviso that said resins (2) and (3) contain less than 10 mol %, preferably less than 0.5 mol % and more preferably less than 0.3 mol %, of silanol functional groups, and the values of x and y are such that:

when y=0, x ranges from 0 to 100,
when x=0, y ranges from 0 to 50,
when x and y are other than 0, x+y may range up to 100 with, however, x being greater than or equal to y;

(4) a crosslinking agent ($CA^{"SiH"}$) comprising at least one dihydrotetraorganodisiloxane ($CAi^{"SiH"}$) and/or at least one linear or cyclic polyorganohydrosiloxane ($CAii^{"SiH"}$) containing from 1.6% to 0.9 mol % of hydrogen atoms bonded directly to silicon ("SiH") in the polymer chain, the organic radicals, which may be identical or different, being $C_1$–$C_{18}$ alkyl or phenyl radicals, at least 80 mol % of said organic radicals being methyl radicals; the aforesaid crosslinking agents are preferably mixed with at least one polyorganohydrosiloxane resin ($CAiii^{"SiH"}$) which comprises $R_2HSiO_{1/2}$, $RSiO_{3/2}$ and/or $SiO_2$ units, the organic radicals R, which may be identical or different, being $C_1$–$C_{18}$ alkyl or phenyl radicals, at least 80 mol % of said organic radicals being methyl radicals, in a weight ratio ($CAi^{"SiH"}$ and/or $CAii^{"SiH"}$)/($CAiii^{"SiH"}$) ranging from 100/0 to 1/100, preferably from 100/25 to 25/100;

(5) on the order of 0.1 to 1 part by weight, preferably on the order of 0.10 to 0.50 part by weight, of an α-acetylenic alcohol of formula (I) above, as a hydrosilylation inhibiting agent (IA);

(6) a catalytically effective amount of a hydrosilylation catalyst (C);

with the proviso that the amount of crosslinking agent system ($CA^{"SiH"}$) is such that in said curable compositions the ratio of the number of moles of "SiH" originating especially from said crosslinking agent system ($CA^{"SiH"}$) and optionally from the modifier resin ($MR^{"SiH"}$) when it is present/number of moles of "Si alkenyl" originating especially from the polyorganosiloxane oil ($BO^{"Si\ alkenyl"}$) and/or from the modifier resin ($MR^{"Si\ alkenyl"}$) is greater than 1, and preferably is on the order of 1.1 to 1.6.

The silicone polymer constituents ($BO^{"Si\ alkenyl"}$), ($MR^{"Si\ alkenyl"}$), ($MR^{"SiH"}$) and ($CA^{"SiH"}$) may optionally be in dilute or dispersed form in a solvent for silicone polymers.

Exemplary solvents or diluents for silicone polymers include:

(a) conventional hydrocarbon solvents for silicone resins, solvents of aromatic (xylene, toluene, etc.), or saturated aliphatic (hexane, heptane, white spirit, tetrahydrofuran, diethyl ether, etc.) type or chlorinated solvents (methylene chloride, perchloroethylene, etc.); these are generally employed in an amount corresponding to 50–70 parts by weight per 30–50 parts by weight of silicone polymer;

(b) the so-called "reactive" solvents such as:
  (i) liquid organopolysiloxane resins in which the organic radicals are $C_1$–$C_{18}$ alkyl or cycloalkyl or $C_2$–$C_{20}$, preferably $C_2$–$C_{12}$, alkenyl radicals which have a ratio of the number of "M" units/number of "Q" and/or "T" units on the order of 1 to 4 and optionally from 1 to 5 "D" units per 100 moles of liquid resin, and containing from 0.5% to 5 mol % of alkenyl functional groups bonded to silicon ("Si alkenyl") or of hydrogen atoms bonded to silicon ("SiH"); these resins have a viscosity at 25° C. of less than 100 mPa.s, preferably on the order of 2 to 50 mPa.s and are known products, being described, in particular, in U.S. Pat. No. 4,707,531 and European Application EP-A-389,138; and/or (ii) fluid organopolysiloxane oils in which the organic radicals are $C_1$–$C_{18}$ alkyl or cycloalkyl, $C_2$–$C_{20}$ alkenyl or ($C_3$–$C_9$ alkenyl)oxyalkylene($C_2$–$C_4$) radicals, containing from 0.2% to 5 mol % of alkenyl or alkenyloxyalkylene functional groups bonded to silicon at the end(s) of a polymer chain or along the polymer chain, said oils exhibiting a viscosity of less than 200 mPa.s; and/or (iii) olefinically unsaturated hydrocarbons such as $C_{14}$–$C_{18}$ olefins, dibutyl maleate, decyl vinyl ether, dodecyl vinyl ether, camphene, metabisisopropenylbenzene, etc. (these so-called "reactive" solvents are generally employed in an amount corresponding to 20–50 parts by weight per 80–50 parts by weight of silicone polymer);

(c) aqueous emulsions of nonionic surface-active agents (polyvinyl alcohol, polyethoxylated alkyl phenols, oxyethylenated ethers of fatty alcohols, etc.) generally containing on the order of 1–3% by weight of surface-active agent; these are generally employed in a proportion of 40–70 parts by weight per 60–30 parts by weight of silicone polymer.

The linear or cyclic polydiorganosiloxane containing "Si alkenyl" functional groups ($BO^{"Si\ alkenyl"}$) has a viscosity of at least 50 mPa.s, generally on the order of 150 to 1,000 mPa.s. The vinylated oils are commercial products usually employed for preparing curable release compositions (U.S. Pat. No. 4,623,700); those containing higher alkenyl or alkenyloxyalkylene groups (A1) are described, especially, in EP-B-219,720 and EP-A-454,130.

The modifier resins containing "Si alkenyl" functional groups (MR"Si alkenyl"), especially the vinylated resins, are well known to this art; the alkenyl or alkenyloxy radicals may be situated on the "M", "D" or "T" units. These resins can be prepared, for example, by the process described in U.S. Pat. No. 2,676,182, or by that described in U.S. Pat. No. 4,611,042. A treatment which is well known to this art, using a silazane, makes it possible to lower the content of remaining silanol functional groups to less than 0.3% by weight, this being in order to prevent interfering condensation reactions. Also, certain of these resins are available commercially, in most cases in the form of solutions, for example at a concentration of 40–70% in a solvent such as toluene or xylene.

Exemplary modifier resins containing "Si alkenyl" functional groups include:

$MD^{Vi}Q$ wherein the vinyl radicals are included in the "D" units;

$MM^{Vi}Q$ wherein the vinyl radicals are included in a proportion of the "M" units;

$MD^{Vi}T$ wherein the vinyl radicals are included in the "D" units;

$MM^{Hexenyl}Q$ wherein the hexenyl radicals are included in a proportion of the "M" units;

$MM^{Allyloxypropyl}Q$ wherein the allyloxypropyl radicals are included in a proportion of the "M" units.

The modifier resins containing "SiH" functional groups ($MR^{"SiH"}$) are also well known to this art; they are described, in particular, in U.S. Pat. No. 3,772,247. The hydrogen atoms may be situated in the polymer chain or at the end(s) of a polymer chain. Certain of these resins are available commercially, in most cases in the form of solutions, for example at a concentration of 40–70% in a solvent such as toluene or xylene.

Exemplary modifier resins containing "SiH" functional groups include:

MD'Q wherein the hydrogen atoms bonded to silicon are included in the "D" units;

MM'Q wherein the hydrogen atoms bonded to silicon are included in a proportion of the "M" units;

MM'DQ wherein the hydrogen atoms bonded to silicon are included in a proportion of the "M" units;

MDT' wherein the hydrogen atoms bonded to silicon are included in the "T" units.

The dihydrotetraorganodisiloxane crosslinking gent (CAi$^{"SiH"}$) is preferably dihydrotetramethyldisiloxane.

The linear or cyclic polyorganohydrosiloxane crosslinking agent (CAii$^{"SiH"}$) containing "SiH" functional groups in the polymer chain has a dynamic viscosity at 25° C. on the order of 10 to 100 mPa.s.

Said linear or cyclic polyorganohydrosiloxane (CAii$^{"SiH"}$) preferably contains on average, per molecule, at least one "SiH" unit per 4 silicon atoms.

The crosslinking agent polyorganohydrosiloxane resin (CAiii$^{"SiH"}$) containing "SiH" functional groups at the end of a polymer chain exhibits a dynamic viscosity at 25° C. on the order of 1 to 20 mPa.s; it preferably contains on average a number of "SiH" units ranging from 4 "SiH" units per 5 silicon atoms to 8 "SiH" units per 12 silicon atoms.

The dynamic viscosity at 25° C. of the above silicone polymers can be measured using a Brookfield viscometer according to AFNOR standard NFT 76 102 of February 1972.

Exemplary catalysts include the well known derivatives and complexes of metals such as platinum, rhodium, ruthenium, etc. Compare, for example, U.S. Pat. Nos. 3,159,601, 3,159,662, 3,220,972, 3,715,334, 3,775,452, 3,814,730, 3,296,291 and 3,928,629 and French Patent FR-A-1,313,846 and 1,480,409. They are generally employed in an amount on the order of 5 to 500 parts by weight, expressed as metal per million parts by weight of reactive silicone polymers.

As indicated above, the silicone polymer constituents may be present in disperse form in aqueous emulsions of nonionic surface-active agents.

The aqueous emulsion compositions thus obtained may additionally contain latexes of organic polymers in amounts corresponding to a silicone/organic polymer weight ratio, expressed as solids content, on the order of 5/95 to 95/5, preferably on the order of 95/5 to 60/40. The preferred organic polymers are those exhibiting a glass transition temperature Tg on the order of −30° C. to +100° C. Exemplary thereof are the acrylic or methacrylic polymers and copolymers, styrene polymers and copolymers (styrene/butadiene, styrene alkylacrylate, etc., which are optionally carboxylated, styrene/isoprene, etc.), polychloroprene, ethylene/vinyl acetate copolymers, polyvinyl alcohol, etc.

The compositions described above, as such or in aqueous emulsions, can be "single-component", namely prepared by mixing their various constituents (1) to (6) and stored prior to use.

They are, however, preferably "multicomponent" namely prepared at the actual time of their use by mixing the various "components" made up of premixtures of a certain number of said constituents with each other.

The inhibitor (IA) of the invention may by itself be a "component" of said compositions as described above.

In one and the same "component" it is recommended not to formulate together the base "Si alkenyl" polydiorganosiloxane (BO$^{"Si\ alkenyl"}$) and/or the organopolysiloxane adhesion modifier resin containing "Si alkenyl" functional groups (MR$^{"SiH"}$), the constituent(s) of the crosslinking agent (CA$^{"SiH"}$) and/or the modifier resin (MR$^{"SiH"}$) and the hydrosilylation catalyst (C).

Similarly, it is preferable not to combine the inhibitor (IA) and the hydrosilylation catalyst (C) within the same single component.

The present invention also features the "components" in which the inhibitor (IA) of the invention is present, which are selected from among:

(a) a mixture of the inhibitor (IA), of base "Si alkenyl" polydiorganosiloxane oil (BO$^{"Si\ alkenyl"}$) and/or the organopolysiloxane adhesion modifier resin containing "Si alkenyl" functional groups (MR$^{"Si\ alkenyl"}$), as is, or in aqueous emulsion;

(b) a mixture of the inhibitor (IA), of the crosslinking dihydrotetraorganodisiloxane (CAi$^{"SiH"}$) and/or of the crosslinking linear or cyclic polyorganohydrosiloxane (CAii$^{"SiH"}$) and/or of the polyorganohydrosiloxane resin (CAiii$^{"SiH"}$) and/or of the modifier resin containing "SiH" functional groups (MR$^{"SiH"}$), as is, or in aqueous emulsion;

(c) a mixture of the inhibitor (IA), of the organopolysiloxane adhesion modifier resin containing "Si alkenyl" functional groups (MR$^{"Si\ alkenyl"}$) and of the modifier resin containing "SiH" functional groups (MR$^{"SiH"}$), as is, or in aqueous emulsion;

(d) a mixture of the inhibitor (IA), of the base "Si alkenyl" polydiorganosiloxane oil (BO$^{"Si\ alkenyl"}$) and/or of the organopolysiloxane adhesion modifier resin containing "Si alkenyl" functional groups (MR$^{"Si\ alkenyl"}$) and of the crosslinking dihydrotetraorganodisiloxane (CAi$^{"SiH"}$) and/or of the crosslinking linear or cyclic polyorganohydrosiloxane (Caii$^{"SiH"}$) and/or of the polyorganohydrosiloxane resin (CAiii$^{"SiH"}$) and/or of the modifier resin containing "SiH" functional groups (MR$^{"SiH"}$), as is, or in aqueous emulsion;

(e) any one of the "components" (a) to (d) above additionally comprising the aforesaid organic polymer latex.

The curable compositions of the invention are fluid at normal temperature; their viscosity is generally on the order of 100 to 500 mPa.s at 25° C. Said compositions may be applied with the aid of devices employed on industrial paper coating machines, such as a coating head with five rollers, systems with air knives, an equalizer bar, etc., on flexible substrates or materials, and may then be heat-cured, for example by means of infrared lamps, UV radiation or, preferably, by transport through tunnel ovens heated to 70°–200° C. The time of travel in these ovens is a function of the temperature and of the length of the tunnel; this time of travel is generally on the order of 5 to 15 seconds at a temperature on the order of 100° C. and on the order of 1.5 to 3 seconds at a temperature on the order of 180° C. in the case of a tunnel length of 6 meters.

The subject compositions may be deposited onto any flexible material or substrate such as paper of various types (supercalendered, coated, etc.), cardboards, cellulose sheets, metal sheets, plastic films (polyester, polyethylene, polypropylene, etc.), etc.

The amounts of composition which are deposited are typically on the order of 0.5 to 2 g per m$^2$ of area to be treated, which corresponds to the deposition of layers on the order of from 0.5 to 2 μm in thickness.

The materials or substrates thus coated may subsequently be intimately contacted with any pressure-sensitive rubber, acrylic or other adhesive. The adhesive is then easily detachable from such substrates or materials.

In order to further illustrate the present invention and the advantages thereof, the following specific examples are given, it being understood that same are intended only as illustrative and in nowise limitative.

EXAMPLES 1-8

Preparation of the Coating Baths

Approximately $1.2 \times 10^{-3}$ mol of an α-acetylenic alcohol selected from among the following was added to 100 parts by weight of a polymethylvinylsiloxane oil exhibiting a viscosity of 400 mPa.s and containing 1 mol of "SiVi" functional groups in the form of $Me_2ViSiO_{1/2}$ and $MeViSiO$ structural units:

| | | | |
|---|---|---|---|
| (i) 1-pentyn-3-ol | $C_5H_8O$ | 0.10 g | Example 1 |
| (ii) 1-octyn-3-ol | $C_8H_{14}O$ | 0.15 g | Example 2 |
| (iii) ethynylcyclopentanol | $C_7H_{10}O$ | 0.13 g | Example 3 |
| (iv) ethynylcyclohexanol | $C_8H_{12}O$ | 0.15 g | Example 4 |
| (v) ethynylcycloheptanol | $C_9H_{14}O$ | 0.17 g | Example 5 |
| (vi) 3,5-dimethyl-1-hexyn-3-ol | $C_8H_{14}O$ | 0.15 g | Example 6 |
| (vii) 3-methyl-1-dodecyn-3-ol | $C_{13}H_{24}O$ | 0.23 g | Example 7 |
| (viii) 3,7,11-trimethyl-1-dodecyn-3-ol | $C_{15}H_{28}O$ | 0.27 g | Example 8 |

A linear polyorganohydrosiloxane oil was next added, containing on average approximately 1.5 mol % of hydrogen atoms bonded directly to silicon ("SiH") in the polymer chain and exhibiting a dynamic viscosity at 25° C. on the order of 50 mPa.s, in an amount corresponding to an SiH/SiVi molar ratio of 1.4.

After stirring, 90 parts per million of platinum were incorporated in the form of a complex of this metal, prepared from chloroplatinic acid and 1,3-divinyl-1,1,3,3-tetramethyldisiloxane as described in Example 1 of U.S. Pat. No. 3,814,730.

After vigorous homogenization, the mixture was ready for use.

Coating on Paper—Behavior of the Coated Papers Towards Adhesives

The apparatus employed was a Rotomec® pilot machine (marketed by Rotomec) equipped with a solventless head with five rolls.

The substrate employed was glassine paper;
(a) either of Sibille®9564 type marketed by Sibille,
(b) or of Kaemmerer® AV 100 type marketed by Kaemmerer, the weight per unit area of which was on the order of 60 to 70 g/m².

The coating was carried out at a paper travel speed of 100 m/min, in the case of an oven temperature of 125° C., which corresponded to a crosslinking temperature on the substrate of 85° C.

The coated substrates were removed immediately on exiting the machine.

The amount of coating which was deposited was measured by X-ray fluorescence; it was on the order of 1 g/m² of substrate.

The coated papers obtained were contacted with the following adhesive tapes

Tesa® 4651 (rubber)

Tesa® 4970 (acrylic) which are marketed by Beiersdorf.

The composites formed were placed in an air conditioned room (temperature of 23° C.±2° C.; relative humidity of 50%±5).

The quality of the coatings was evaluated by measuring the force of adhesion (or of peeling), expressed in cN/cm according to the FINAT test No. 10 using an Instron® tensometer (marketed by Instron) with a peeling speed of 0.3 m/min.

The results of the measurements are reported in Table 1.

It was found that with the exception of the α-acetylenic alcohols of Examples 1 and 2, the other inhibitors provided similar coating performance, all conditions being otherwise equal.

Measurement of Reactivity

The reactivity of the baths was measured:
(1) on the one hand, by monitoring the change in the viscosity of the bath in an RAPRA VNC® (Vibrating Needle Curemeter) apparatus from RAPRA TeChnologie; the time, in minutes, required to obtain gelling (determined using a needle vibrating in the bath at a frequency of approximately 40 Hz) was measured in an oven heated to 70° C.; and
(2) on the other, by monitoring the thermal progress of the crosslinking reaction by differential thermal analysis (DSC) between 0° and 250° C. in a Mettler T.A. 3000® apparatus, by employing from 5 to 10 mg of product deposited in a sealed capsule, the temperature increasing by 10° C. per minute.

The results of these measurements are reported in Table 2.

The α-acetylenic alcohols of Examples 1 and 2 produced very reactive baths. On the other hand, it was found that the enthalpy of the reaction ΔH was not affected by the type of α-acetylenic alcohol, evidencing a complete conversion of the reactive sites.

Measurement of the Stability of the Baths at 40° C.

The change in the viscosity of the baths as a function of time was measured with the aid of a Brookfield viscometer.

The reaction vessel was immersed in a bath thermostatted at 40° C.; the measurement was stopped when the viscosity reached 2000 mPa.s; the time elapsed was noted.

The results are reported in Table 3.

Measurement of Stability by Measuring the Polymerization Time in a Thin Layer

The substrate employed was a Terphane® polyester film of 36μ-m thickness, marketed by Rhone-Poulenc.

The coating was carried out conventionally using a manual coating system (Roll Coater® marketed by ETM).

The coated film was placed in an air conditioned room (relative humidity 55%; temperature 20°±1.)

The change in the coating was monitored by rubbing with a finger; the measurement was stopped when the film was "dry"; the time which had elapsed was measured.

The results are reported in Table 3.

The advantage of using α-acetylenic alcohols containing a number of carbon atoms greater than 11 was ascertained very clearly. The stability of the baths, both in a vessel at 40° C. and in a thin layer at 20° C., was very greatly increased when $C_{13}$ and $C_{15}$ inhibitors were employed (Examples 7 and 8).

EXAMPLE 9

A coating bath was prepared as above, by incorporating 0.23 g of 3-methyl-1-dodecyn-3-ol as inhibitor in 100 g of a polymethylvinylsiloxane oil exhibiting a viscosity of 400 mPa.s and containing 1 mol % of "SiVi" functional groups in the form of $Me_2ViSiO_{1/2}$ and MeViSiO structural units.

A mixture of crosslinkers was added, i.e.:

(a) 60 parts by weight of a linear polyorganohydrosiloxane oil containing on average approximately 1.5 mol % of hydrogen atoms bonded directly to silicon ("SiH") in the polymer chain and exhibiting a dynamic viscosity at 25° C. on the order of 50 mPa.s, and (b) 40 parts by weight of a polyorganohydrosiloxane resin comprising $Me_2HSiO_{1/2}$ and $SiO_2$ units, containing 1 mol % of hydrogen atoms bonded to silicon, having a dynamic viscosity on the order of 10 mPa.s, in an amount corresponding to an SiH/SiVi molar ratio of 1.4.

90 ppm of the platinum catalyst described above were then added.

The performance of this preparation is reported in Tables 1 to 3; the operation of coating on paper was carried out at a paper travel speed of 120 m/min, with an oven temperature of 125° C., which corresponded to a temperature of 75° C. on the substrate.

This performance was compared with that of the bath of Example 7.

EXAMPLE 10

The procedure of Example 7 was repeated using as base oil a polymethylhexenylsiloxane oil exhibiting a viscosity on the order of 500 mPa.s and containing 1 mol of "SiHexenyl" functional groups in the form of $Me_2HexenylSiO_{1/2}$ and MeHexenylSiO structural units.

The performance of the bath obtained is reported in Tables 1 to 3; the operation of coating on paper was carried out at a paper travel speed of 110 m/min, with an oven temperature of 125° C., which corresponded to a temperature of 80° C. on the substrate.

EXAMPLE 11

The procedure described in Example 9 was repeated using as base oil a polymethylhexenylsiloxane oil exhibiting a viscosity on the order of 500 mPa.s and containing 1 mol % of "SiHexenyl" functional groups in the form of $Me_2HexenylSiO_{1/2}$ and MeHexenylSiO structural units.

The performance of the bath obtained is reported in Tables 1 to 3; the operation of coating on paper was carried out at a paper travel speed of 140 m/min, with an oven temperature of 125° C. which corresponded to a temperature of 65° C. on the substrate.

The results of Examples 9 and 11, compared with Examples 7 and 10, respectively, evidence that the use of a crosslinking system (oil containing "SiH" units in the polymer chain+resin containing end "SiH" units) very markedly improved the rate of polymerization without, however, decreasing bath stability.

TABLE 1

| Example | Oven temp. °C. | Coating speed m/min | Temp. on substrate °C. | Polymerization on exiting machine | Subsequent development of adhesion % | Adhesion cN/cm TESA 4651 | Adhesion cN/cm TESA 4970 |
|---|---|---|---|---|---|---|---|
| 1 | 125 | 100 | 85 | poor* | — | — | — |
| 2 | 125 | 100 | 85 | poor* | — | — | — |
| 3 | 125 | 100 | 85 | good | 98 | 3.5 | 10 |
| 4 | 125 | 100 | 85 | good | 100 | 3.7 | 9.5 |
| 5 | 125 | 100 | 85 | good | 99 | 3.6 | 9.8 |
| 6 | 125 | 100 | 85 | good | 98 | 3.3 | 9.4 |
| 7 | 125 | 100 | 85 | good | 100 | 3.4 | 10.1 |
| 8 | 125 | 100 | 85 | good | 98 | 3.7 | 9.5 |
| 7 | 125 | 100 | 85 | good | 98 | 3.5 | 11 |
| 9 | 125 | 120 | 75 | good | 99 | 3.8 | 10.5 |
| 10 | 125 | 110 | 80 | good | 97 | 3.7 | 10 |
| 11 | 125 | 140 | 65 | good | 98 | 3.5 | 10.5 |

(*) The bath polymerized on the coating rolls

TABLE 2

| Example | Gel time at 70° C. in VNC (mm) | DSC peak start temp. °C. | DSC peak top temp. °C. | ΔH J/g |
|---|---|---|---|---|
| 1 | 4.8 | 61 | 76 | 37 |
| 2 | 21 | 61 | 78 | 37 |
| 3 | 33 | 85 | 103 | 39 |
| 4 | 35 | 79 | 100 | 38 |
| 5 | 40 | 85 | 106 | 39 |
| 6 | 40 | 82 | 100 | 38 |
| 7 | 45 | 81 | 100 | 38 |
| 8 | 45 | 80 | 105 | 39 |
| 7 | 45 | 81 | 100 | 38 |
| 9 | 35 | 72 | 98 | 39 |
| 10 | 38 | 78 | 98 | 39 |
| 11 | 30 | 69 | 97 | 38 |

TABLE 3

| Example | Time to reach a viscosity of 2000 mPa · s | Polymerization time in thin layer (min) |
|---|---|---|
| 1 | gelling in a few minutes | 15 |
| 2 | gelling in 30 minutes | 20 |
| 3 | 8 hours | 40 |

TABLE 3-continued

| Example | Time to reach a viscosity of 2000 mPa · s | Polymerization time in thin layer (min) |
|---|---|---|
| 4 | 9 hours | 80 |
| 5 | 9 hours | 80 |
| 6 | 9 hours | 50 |
| 7 | 15 hours | 1500 |
| 8 | 15 hours | 1500 |
| 7 | 15 hours | 1500 |
| 9 | 12 hours | 1350 |
| 10 | 14 hours | 1300 |
| 11 | 10 hours | 950 |

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A stable curable silicone composition, comprising a hydrosilylation-curable polyorganosiloxane and a crosslinking agent therefor, a hydrosilylation-inhibiting amount of a long chain acetylenic alcohol, and a catalytically effective amount of it hydrosilylation catalyst, said long chain acetylenic alcohol having the formula:

R—(R')C(OH)—C≡CH    (I)

in which R is a linear or branched alkyl radical or a phenyl radical, R' is H or a linear or branched alkyl radical or a phenyl radical, and further wherein the total number of carbon atoms contained in R and R' is at least 9 and at most 20.

2. A stable curable silicone composition as defined by claim 1, said long chain acetylenic alcohol having a boiling point higher than 250° C.

3. A stable curable silicone composition as defined by claim 1, said long chain acetylenic alcohol comprising 3-methyl-1-dodecyn-3-ol.

4. A stable curable silicone composition as defined by claim 1, said long chain acetylenic alcohol comprising 3,7,11-trimethyl-1-dodecyn-3-ol.

5. A stable curable silicone composition as defined by claim 1, said long chain acetylenic alcohol comprising 1,1-diphenyl-2-propyn-3-ol.

6. A stable curable silicone composition as defined by claim 1, said long chain acetylenic alcohol comprising 3-ethyl-6-ethyl-1-nonyn-3-ol.

7. A stable curable silicone composition as defined by claim 1, said long chain acetylenic alcohol comprising 3-methyl-1-pentadecyn-3-ol.

8. A stable curable silicone composition as defined by claim 1, the total number of carbon atoms in the radicals R and R' of the long chain acetylenic alcohol of formula (I) ranging from 11 to 20.

9. A stable curable silicone composition as defined by claim 1, said curable polyorganosiloxane comprising an alkenylated or alkenyloxyalkylenated polydiorganosiloxane oil and/or at least one Si alkenylated organopolysiloxane adhesion modifier resin.

10. A stable curable silicone composition as defined by claim 9, said curable polyorganosiloxane further comprising at least one organohydropolysiloxane adhesion modifier resin.

11. A stable curable silicone composition as defined by claim 9, said crosslinking agent comprising at least one dihydrotetraorganodisiloxane and/or at least one polyorganohydrosiloxane.

12. A stable curable silicone composition as defined by claim 11, said hydrosilylation catalyst comprising a platinum compound/complex.

13. A stable curable silicone composition as defined by claim 11, the polysiloxane constituents thereof being dispersed in a solvent therefor.

14. A stable curable silicone composition, comprising a hydrosilylation-curable polyorganosiloxane and a crosslinking agent therefor, a hydrosilylation-inhibiting amount of a long chain acetylenic alcohol, and a catalytically effective amount of a hydrosilylation catalyst, said long chain alcohol having the formula:

R—(R')C(OH)—C≡CH    (I)

in which R is a linear or branched alkyl radical or a phenyl radical, R' is H or a linear or branched alkyl radical or a phenyl radical, wherein the total number of carbon atoms contained in R and R' is at least 9 and at most 20, said curable polyorganosiloxane comprising an alkenylated or alkenyloxyalkylenated polydiorganosiloxane oil and/or at least one Si alkenylated organopolysiloxane adhesion modifier resin, said crosslinking agent comprising at least one dihydrotetraorganodisiloxane and/or at least one polyorganohydrosiloxane, with the polysiloxane constituents being dispersed in an aqueous emulsion of a nonionic surfactant.

15. A stable curable silicone composition, comprising a hydrosilylation-curable polyorganosiloxane and a crosslinking agent therefor, a hydrosilylation-inhibiting amount of a long chain acetylenic alcohol, and a catalytically effective amount of a hydrosilylation catalyst, said long chain alcohol having the formula:

R—(R')C(OH)—C≡CH    (I)

in which R is a linear or branched alkyl radical or a phenyl radical, R' is H or a linear or branched alkyl radical or a phenyl radical, wherein the total number of carbon atoms contained in R and R' is at least 9 and at most 20, said curable polyorganosiloxane comprising an alkenylated or alkenyloxyalkylenated polydiorganosiloxane oil and/or at least one Si alkenylated organopolysiloxane adhesion modifier resin, said crosslinking agent comprising at least one dihydrotetraorganodisiloxane and/or at least one polyorganohydrosiloxane, wherein the composition further comprises an organic polymer latex.

16. A composition of matter comprising an alkenylated or alkenyloxyalkylenated polydiorganosiloxane oil and/or at least one Si alkenylated organopolysiloxane adhesion modifier resin, and a hydrosilylation-inhibiting amount of a long chain acetylenic alcohol having the formula:

R—(R')C(OH)—C≡CH    (I)

in which R is a linear or branched alkyl radical or a phenyl radical, R' is H or a linear or branched alkyl radical or a phenyl radical wherein the total number of carbon atom, contained in R and R' is at least 9 and at most 20.

17. A composition of matter comprising at least one dihydrotetraorganodisiloxane and/or at least one polyorganohydrosiloxane and/or at least one organohydropolysiloxane adhesion modifier resin, and a hydrosilylation-inhibiting amount of a long chain acetylenic alcohol having the formula:

in which R is a linear or branched alkyl radical or a phenyl radical, R' is H or a linear or branched alkyl radical or a phenyl radical wherein the total number of carbon atoms contained in R and R' is at least 9 and at most 20.

18. A composition of matter comprising at least one Si alkenylated organopolysiloxane adhesion modifier resin and/or at least one organohydropolysiloxane adhesion modifier resin, and a hydrosilylation-inhibiting amount of a long chain acetylenic alcohol having the formula:

in which R is a linear or branched alkyl radical or a phenyl radical R' is H or a linear or branched alkyl radical or a phenyl radical, wherein the total number of carbon atoms contained in R and R' is at least 9 and at most 20.

19. A stable substrate coated with the curable silicone composition as defined by claim 1.

20. A stable substrate having a release coating thereon, said release coating comprising the silicone composition as defined by claim 1, in crosslinked elastomeric state.

21. A stable composition of matter as defined by claim 16, further comprising at least one dihydrotetraorganodisiloxane and/or at least one polyorganohydrosiloxane and/or at least one organohydropolysiloxane adhesion modifier resin.

22. A stable curable silicone composition as defined by claim 1, wherein said polyorganosiloxane comprises at least one base Si alkenyl polydiorganosiloxane oil which comprises a linear or cyclic polydiorganosiloxane blocked with triorganosiloxane endgroups, the organic radicals thereof being $C_1$–$C_8$ alkyl or cycloalkyl, $C_2$–$C_{20}$ alkenyl, ($C_3$–$C_9$ alkenyl)oxyalkylene($C_2$–$C_4$) or phenyl radicals, at least 80 mol % of said radicals being methyl radicals, and at least 0.1 mol % of said organic radicals, which may be identical or different, being alkenyl or alkenyloxyalkylene radicals bonded directly to silicon.

23. A stable curable silicone composition as defined by claim 1, wherein said polyorganosiloxane further comprises at least one organopolysiloxane adhesion modifier resin containing Si alkenyl functional groups which comprises at least two types of siloxy units selected from the group consisting of $R_3SiO_{1/2}$, $SiO_2$, and $R_2SiO_{3/2}$ and optionally $R_2SiO_{2/2}$, the organic R radicals, which may be identical or different, being $C_1$–$C_{18}$ alkyl or cycloalkyl, $C_2$–$C_{20}$ alkenyl or ($C_3$–$C_9$ alkenyl)oxyalkylene($C_2$–$C_4$) radicals, at least 80 mol % of the organic radicals being methyl radicals, and said resin containing at least 0.1 mol % of said alkenyl or alkenyloxyalkylene radicals bonded to silicon, wherein a ratio of the number of $R_3SiO_{1/2}$ units to the number of $SiO_2$ and $RSiO_{3/2}$ units is 0.6–1, and the number of optional $R_2SiO_{2/2}$ units being 0.5–10 per 100 moles of resin.

24. A stable curable silicone composition as defined by claim 1, wherein said polyorganosiloxane further comprises at least one adhesion modifier resin containing an organohydropolysiloxane SiH functional group which comprises at least two types of siloxy units selected from the group consisting of $R_3SiO_{1/2}$, $R_2HSiO_{1/2}$, $RSiO_{3/2}$ and $HSiO_{3/2}$, and optionally $R_2SiO_{2/2}$ or $RHSiO_{2/2}$, the organic radicals R, which may be identical or different, being $C_1$–$C_{18}$ alkyl or phenyl radicals, at least 80 mol % of said radicals being methyl radicals, and said resin containing at least 0.5 mol % of hydrogen atoms bonded directly to silicon, with a ratio of the number of $R_3SiO_{1/2}$ and $R_2HSiO_{1/2}$ units to the number of $RSi_{3/2}$ and $HSiO_{2/2}$ units being 0.6–1, and the number of optional $R_2SiO_{2/2}$ or $RHSiO_{2/2}$ units being 0.5–10 per 100 moles of resin.

25. A stable curable silicone composition as defined by claim 1, wherein said crosslinking agent comprises at least one dihydrotetraorganodisiloxane and/or at least one linear or cyclic polyorganohydrosiloxane containing from 1.6% to 0.9 mol % of hydrogen atoms bonded directly to silicon in the polymer chain, the organic radicals, which may be identical or different, being $C_1$–$C_{18}$ alkyl or phenyl radicals, at least 80 mol % of said organic radicals being methyl radicals.

26. A stable curable silicone composition as defined by claim 25, wherein the crosslinking agent further comprises at least one polyorganohydrosiloxane resin, said polyorganohydrosiloxane resin comprising $R_2HSiO_{1/2}$, $RSiOB_{3/2}$ and/or $SiO_2$ units, the organic radicals R, which may be identical or different, being $C_1$–$C_{18}$ alkyl or phenyl radicals, at least 80 mol % of said organic radicals being methyl radicals, wherein a weight ratio of dihydrotetraorganodisiloxane and linear or cyclic polyorganohydrosiloxane to polyorganohydrosiloxane ranges from 100/0 to 1/100.

27. A stable curable silicone composition as defined by claim 1:
  wherein said polyorganosiloxane comprises at least one base Si alkenyl polydiorganosiloxane oil which comprises a linear or cyclic polydiorganosiloxane blocked with triorganosiloxane endgroups, the organic radicals thereof being $C_1$–$C_{18}$ alkyl or cycloalkyl, $C_2$–$C_{20}$ alkenyl, ($C_3$–$C_9$ alkenyl)oxyalkylene($C_2$–$C_4$) or phenyl radicals, at least 80 mol % of said radicals being methyl radicals, and at least 0.1 mol % of said organic radicals, which may be identical or different, being alkenyl or alkenyloxyalkylene radicals bonded directly to silicon;
  said polyorganosiloxane further comprising at least one organopolysiloxane resin comprising an adhesion modifier resin containing Si alkenyl functional groups which comprises at least two types of siloxy units selected from the group consisting of $R_3SiO_{1/2}$, $SiO_2$, and $RSiO_{3/2}$ and optionally $R_2SiO_{2/2}$, the organic radicals R which may be identical or different, being $C_1$–$C_{18}$ alkyl or cycloalkyl, $C_2$–$C_{20}$ alkenyl or ($C_3$–$C_9$ alkenyl)oxyalkylene($C_2$–$C_4$) radicals, at least 80 mol % of the organic radicals being methyl radicals, and said resin containing at least 0.1 mol % of said alkenyl or alkenyloxyalkylene radicals bonded to silicon, wherein a ratio of the number of $R_3SiO_{1/2}$ units to the number of $SiO_2$ and $RSiO_{3/2}$ units is 0.6–1, and the number of optional $R_2SiO_{2/2}$ units being 0.5–10 per 100 moles of resin;
  said at least one adhesion modifier resin further comprising at least one adhesion modifier resin containing an organohydropolysiloxane SiH functional group which comprises at least two types of siloxy units selected from the group consisting of $R_3SiO_{1/2}$, $R_2HSiO_{1/2}$, $RSiO_{3/2}$ and $HSiO_{3/2}$, and optionally $R_2SiO_{2/2}$ or $RHSiO_{2/2}$, the organic radicals R, which may be identical or different, being $C_1$–$C_{18}$ alkyl or phenyl radicals, at least 80 mol % of said radicals being methyl radicals, and said resin containing at least 0.5 mol % of hydrogen atoms bonded directly to silicon, with a ratio of the number of $R_3SiO_{1/2}$ and $R_2HSiO_{1/2}$ units to the number of $RSiO_{3/2}$ and $HSiO_{3/2}$ units being 0.6–1, and the number of optional $R_2SiO_{2/2}$ or $RHSiO_{2/2}$ units being 0.5–0 per 100 moles of resin, said organopolysiloxane and organohydropolysiloxane resins containing less than 10 mol % of silanol functional groups;
  said crosslinking agent comprising at least one dihydrotetraorganodisiloxane and/or at least one linear or cyclic polyorganohydrosiloxane containing from 1.6% to 0.9 mol % of hydrogen atoms bonded directly to silicon in the polymer chain, the organic radicals, which may be identical or different, being $C_1$–$C_{18}$ alkyl or phenyl radicals, at least 80 mol % of said organic radicals being methyl radicals.

28. A stable curable silicone composition as defined by claim 27, wherein the amount of the crosslinking agent is such that in said curable compositions the ratio of the number of moles of SiH originating from said crosslinking agent system and from the adhesion modifier resin to the number of moles of Si alkenyl originating from the polyorganosiloxane oil and/or from the modifier resin is greater than 1.

29. A stable curable silicone composition as defined by claim 27, wherein $$z=(100-x-y),$$

wherein z represents the parts by weight of said at least one base Si alkenyl polydiorganosiloxane oil, x represents the parts by weight of said at least one organopolysiloxane adhesion modifier resin containing Si alkenyl functional groups, and y represents the parts by weight of said at least one adhesion modifier resin containing an organohydropolysiloxane SiH functional group, wherein the values of x and y are such that:

when y=0, x ranges from 0 to 100, when x=0, y ranges from 0 to 50, and when x and y are other than 0, x+y ranges up to 100 with x being greater than or equal to y.

30. A stable curable silicone composition as defined by claim 27, wherein said crosslinking agent further comprises at least one polyorganohydrosiloxane resin which comprises $R_2HSiO_{1/2}$, $RSiO_{3/2}$ and/or $SiO_2$ units, the organic radicals R, which may be identical or different, being $C_1$–$C_{18}$ alkyl or phenyl radicals, at least 80 mol % of said organic radicals being methyl radicals, in a weight ratio of dihydrotetraorganodisiloxane and/or linear cyclic polyorganohydrosiloxane to polyorganohydrosiloxane resin which comprises $R_2HSiO_{1/2}$, $RSiO_{3/2}$ and/or $SiO_2$ units ranging from 100/0 to 1/100.

* * * * *